US012157926B2

(12) United States Patent
Cruijff et al.

(10) Patent No.: US 12,157,926 B2
(45) Date of Patent: Dec. 3, 2024

(54) ANNEALING LINE FOR A STEEL STRIP

(71) Applicant: TATA STEEL IJMUIDEN B.V., Velsen-Noord (NL)

(72) Inventors: Marcel Cruijff, Den Ilp (NL); Marga Josina Zuijderwijk, Santpoort-Noord (NL)

(73) Assignee: TATA STEEL IJMUIDEN B.V., Velsen-Noord (NL)

(*) Notice: Subject to any disclaimer, the term of this patent is extended or adjusted under 35 U.S.C. 154(b) by 820 days.

(21) Appl. No.: 17/278,789

(22) PCT Filed: Oct. 30, 2019

(86) PCT No.: PCT/EP2019/079734
§ 371 (c)(1),
(2) Date: Mar. 23, 2021

(87) PCT Pub. No.: WO2020/089336
PCT Pub. Date: May 7, 2020

(65) Prior Publication Data

US 2022/0033930 A1 Feb. 3, 2022

(30) Foreign Application Priority Data

Oct. 30, 2018 (EP) .................................... 18203455

(51) Int. Cl.
*C21D 9/56* (2006.01)
*C21D 1/74* (2006.01)
(Continued)

(52) U.S. Cl.
CPC ............... *C21D 9/561* (2013.01); *C21D 1/74* (2013.01); *F27B 9/045* (2013.01); *F27B 9/28* (2013.01); *F27D 7/06* (2013.01)

(58) Field of Classification Search
CPC . C21D 1/74; C21D 9/561; F27B 9/045; F27B 9/28; F27D 2009/0008; F27D 7/06
(Continued)

(56) References Cited

U.S. PATENT DOCUMENTS 3,262,688 A * 7/1966 Beggs .................... C21D 1/667 432/8
3,667,270 A * 6/1972 Deurloo .................. B21B 28/04 29/90.01

(Continued)

FOREIGN PATENT DOCUMENTS

EP 2458022 A1 5/2012
GB 742930 A 1/1956

(Continued)

OTHER PUBLICATIONS

International Search Report and Written Opinion mailed Dec. 6, 2019 for PCT/EP2019/079734 to Tata Steel Ijmuiden B.V. filed Oct. 30, 2019.

*Primary Examiner* — Jessee R Roe
*Assistant Examiner* — Michael Aboagye
(74) *Attorney, Agent, or Firm* — Vorys, Sater, Seymour and Pease LLP

(57) ABSTRACT

An annealing line for a steel strip, a device for use in such an annealing line and a method for annealing a steel strip. The annealing line including a connecting chamber connecting a first heating section and a second heating section, wherein one or more devices, located in the connecting chamber, are arranged on one or both sides of the steel strip for oxidising the steel strip using an oxidising gas mixture, each device having a body including an internal chamber and one or more openings to project the oxidising gas mixture onto the surface of the steel strip.

20 Claims, 7 Drawing Sheets

(51) Int. Cl.
*F27B 9/04* (2006.01)
*F27B 9/28* (2006.01)
*F27D 7/06* (2006.01)

(58) Field of Classification Search
USPC .................................. 266/249, 250, 251, 252
See application file for complete search history.

(56) References Cited

U.S. PATENT DOCUMENTS

| | | | | |
|---|---|---|---|---|
| 4,363,472 | A | 12/1982 | Shimoyama et al. | |
| 4,836,774 | A * | 6/1989 | Harada | C21D 9/63 432/59 |
| 11,193,196 | B2 * | 12/2021 | Dubois | C23C 8/14 |
| 2010/0269367 | A1 * | 10/2010 | Langevin | F26B 13/10 34/611 |

FOREIGN PATENT DOCUMENTS

| | | | | |
|---|---|---|---|---|
| JP | H0726332 | A | 1/1995 | |
| JP | 2010174282 | A | 8/2010 | |
| JP | 2012126964 | A | 7/2012 | |
| JP | 2018520261 | A | 7/2018 | |
| WO | 2016156125 | A1 | 10/2016 | |
| WO | WO2016177590 | * | 10/2016 | C21D 11/005 |
| WO | 2016177590 | A1 | 11/2016 | |

* cited by examiner

ANNEALING LINE FOR A STEEL STRIP

CROSS-REFERENCE TO RELATED APPLICATIONS

This is a § 371 National Stage Application of International Application No. PCT/EP2019/079734 filed on Oct. 30, 2019, claiming the priority of European Patent Application No. 18203455.3 filed on Oct. 30, 2018.

FIELD OF THE INVENTION

The invention relates to an annealing line for a steel strip, a device for use in such an annealing line and a method for annealing a steel strip. The annealing line comprising a connecting chamber connecting a first heating section and a second heating section, wherein one or more devices, located in the connecting chamber, are arranged on one or both sides of the steel strip for oxidising the steel strip using an oxidising gas mixture, each device having a body comprising an internal chamber and one or more openings to project the oxidising gas mixture onto the surface of the steel strip.

BACKGROUND OF THE INVENTION

The demands of, for example, the automotive industry with respect to higher safety levels in combination with lower weight, has led to the development of the Advanced High Strength Steels or AHSS. The alloying elements, such as manganese, silicon, aluminium or chromium, used in the production of these steels may result in the formation of a thin layer of thermodynamically stable oxides on the surface of the steel strip during the annealing operation, which precedes the dipping in the galvanising bath. This is a liquid metal bath which predominantly contains zinc but can also have other alloying elements. The oxidation of these alloying elements on the surface of the steel strip might harm the zinc “wettability”, or results in poor adhesion of zinc and therefore the quality of the applied zinc coating.

Steel makers have therefore suggested solutions that subject the steel strip surface to temperatures and atmosphere conditions that quickly oxidise (also called pre-oxidation) the steel strip in the Direct Fire Furnace (DFF)/Non Oxidising Furnace (NOF) part, or in the first heating section of the annealing line (or annealing furnace). In the subsequent Radiant Tube Furnace (RTF) or second heating section the formed oxides are reduced and in this manner migration of the oxidisable alloy elements towards the surface is prevented.

Devices that oxidise steel strips are known in the state of the art. EP 2458 022 A1 discloses the projection of a specific oxidising gas mixture, or oxidising medium, onto one or both surfaces of a steel strip between the non-oxidising, or direct furnace section (first heating section) and the radiant tube section (second heating section) in order to have a controlled oxidation of the steel strip. The oxidising gas mixture is distributed evenly along the steel strip surface such that the steel strip oxidises evenly and reproducibly.

Production practice has shown that the device used to apply the method of EP 2458 022 A1 has a few drawbacks with respect to the application of the oxidising gas mixture or oxidising medium. The device used in this method is aimed at an even application of an oxidising gas mixture to the steel strip. However, in practice steel strips are processed with a number of different widths. The method of EP 2458 022 A1 does not take the oxidising of different widths of the steel strips into account. This means, when in practice oxidising gas mixture is applied to narrower steel strips, that around the edges of the steel strip a higher oxygen concentration occurs, leading to the risk of over-oxidation of the edges of the steel strip.

JP2010-174282 describes the application of an oxidising gas in the final oxidation zone of the DFF. The patent application specifically mentions this zone as the preferred zone, since the position of the device in the zone between the DFF and the RTF section would be too close to the reducing zone of the RTF section. It states that there would be an increased risk that gases with an oxidising effect would contaminate the reducing zone. The device consists of a tubular body divided 20) into a plurality of chambers along the width of the steel strip. All chambers are equipped with adjustable nozzles to apply the gas to the steel strip. The gas flow, through pipes to the chambers, is individually controlled by valves. However, under industrial circumstances it is difficult to achieve a homogenous pre-oxidation across the steel strip with the burners in the direct fire furnace. Furthermore, the design with numerous valves is prone to cause differences in the flow into the chambers and therefore a difference in the flow of the oxidising gas mixture to the steel strip.

It is an object of the invention to overcome the drawbacks of the prior art and to have a more flexible annealing line that is able to process a wider range of steel strips having different widths, with more flexibility towards the oxidising gas mixture flow over the width of the steel strip. Another object of the invention is to prepare a more even oxidising profile over the width of the steel strip such that before the hot dip galvanising process the surface of the steel strip is evenly oxidised and the galvanising process is offered a steel strip having a better quality to apply the zinc coating. It is another object of the invention to come to a more robust design of the device that is less prone to dirt accumulation.

SUMMARY OF THE INVENTION

To promote the objectives of the invention an annealing line is proposed in accordance with the features of one or more of the appended claims.

Accordingly, the internal chamber of the invention is divided into three or more compartments. When the internal chamber is divided into three compartments at least two different widths could be oxidised in the annealing line. Therefore, three compartments give the annealing line more flexibility towards the processing of steel strips having different widths.

More than three compartments in the internal chamber give the annealing line an even better flexibility. The compartments are arranged to provide the steel strip with the oxidising gas mixture and controlled depending on the width of the steel strip to be processed. The greater the width of the steel strip in the process, the more compartments are provided with the oxidising gas mixture. The incoming oxidising gas mixture for oxidising the steel strip is provided into at least one of the three or more compartments and therefore a more symmetrical flow profile of the oxidising gas over the width of the steel strip is achieved during the oxidation step of the annealing process. The symmetrical flow profile leads to a more symmetrical oxidation process of the surface of the steel strip and therefore the zinc “wettability” and the quality of the applied zinc coating of the steel strip will be improved.

As well known to a person skilled in the art the oxidising gas mixture in an annealing line comprises a mixture of nitrogen and air or a mixture of nitrogen and oxygen. Typical oxidising gas mixtures in an annealing line comprise an oxygen content in the range of 0.5-10 vol %, preferably in the range of 0.5-7 vol %, more preferably in the range of 1.0-4.0 vol %.

In a preferred embodiment the internal chamber comprises a central compartment and a first pair of outer compartments, each outer compartment is positioned adjacent to the central compartment and preferably the pair of outer compartments is controllable together. The width of the steel strips to be oxidised in practice differs. Therefore the wider steel strips need application of the oxidising gas mixture over a greater width than the narrower steel strips. For the narrowest steel strips the flow of oxidising gas mixture through only the central compartment would suffice. The width of this central compartment corresponds to the narrowest width of the steel strip to be processed and will, in normal practice always be in use to project the oxidising gas mixture to the surface of the steel strip. This is beneficial because there will be no supply of the oxidising gas mixture next to the steel strip and therefore has no risk of over-oxidation of the strip edges. Wider steel strips are oxidised by applying gas through the pair of outer compartments as well.

The outer compartments are associated with each other like a pair, meaning there are two outer compartments each adjacent to the central compartment and they are controllable together, meaning the supply of oxidising gas mixture is the same over the two individual outer compartments of the pair of outer compartments. The first pair of outer compartments adjacent to the central compartment can be used when the width of the steel strip is wider than the width of the central compartment. In that case also the first pair of outer components will project the oxidising gas onto the steel strip such that the central compartment and the first pair of outer compartments project the oxidising gas mixture onto the surface of the steel strip.

In another preferred embodiment, the internal chamber further comprises a second pair of outer compartments, each outer compartment is positioned adjacent to the first pair of outer compartments and preferably the pair of outer compartments is controllable together. When the width of the steel strip to be oxidised is wider than the width of the central compartment and the first pair of outer compartments, a second pair of outer compartments could be added to project the oxidising gas mixture onto the surface of the steel strip, leading to the oxidising of an even wider steel strip, with a total of five compartments. The second pair of outer compartments is also controllable together in the same way as explained for the first pair of outer compartments.

In a further preferred embodiment the internal chamber further comprises one or more additional pairs of outer compartments, each outer compartment of each additional pair of outer compartments is positioned adjacent to an outer compartment of another pair of outer compartments and preferably the outer compartments in each pair is controllable together. It will be clear that the addition of outer compartments is done in pairs according to the width of the steel strip to be oxidised. For example, in the annealing line the width of the steel strip may vary between 800 and 2100 mm or between 1200 and 2100 mm. Therefore, the number of outer compartments in use will be an even number, so 2, 4, 6, 8 and so on. The total number of compartments used therefore is an odd number, being 1, 3, 5, 7, 9 and so on. Each additional pair of outer compartments will be added to a pair of outer compartments closer, or more adjacent, to the central compartment to provide for even wider steel strips to be oxidised.

Preferably, the device has an elongated shape. To be able to oxidise the different widths of the steel strips to be processed the elongated shape of the device is particularly beneficial. The shape of the device is attuned to the widths of the steel strips to be oxidised and as explained earlier, the addition of outer compartments in pairs will result in a more even flow of oxidising gas mixture to the surface of the steel strip.

In a preferred embodiment, the device comprises inlet means for providing the oxidising gas mixture, a first inlet means coupled to a first conduit for providing the oxidising gas mixture to the central compartment and the device further comprises a second inlet means coupled to a second conduit for providing the oxidising gas mixture to the first pair of outer compartments. This will have the benefit of an elegant and easy to maintain configuration. Like explained above, the aim is to achieve a symmetrical flow profile of the oxidising gas mixture over the width of the steel strip. For the narrowest steel strips only the central compartment will be used, the outer compartments are in that case not in use. In that case only one inlet means is used, coupled to a first conduit to provide the oxidising gas mixture to the central compartment. The inlet means are connected to an oxidising gas mixture supply containing a gas mixture comprising for example nitrogen ($N_2$), oxygen ($O_2$), or air. Other gases may also be part of the oxidising gas mixture, such as water ($H_2O$) or carbon dioxide ($CO_2$). A suitable percentage of oxygen gas is for example 3%. The inlet means are connected to flow control means that are located outside the annealing furnace and are as such no part of this invention.

The gas flow to the first pair of outer compartments will be used to accommodate for steel strips that are wider than the width of the central compartment. As explained earlier, this can be done in increments of a pair of, meaning two, outer components. The second inlet means are coupled to a second conduit for providing the oxidising gas mixture to the first pair of outer compartments. This configuration of inlet means coupled to conduits for providing an oxidising gas mixture to the central and first pair of outer compartments results in an even flow, an even pressure and an even temperature of the oxidising gas mixture through the pair of outer compartments allowing the gas to flow out of the openings to the steel strip in a controlled manner leading to a more symmetrical oxidising of the surface of the steel strip. Therefore this configuration allows more control over the flow of the gas over the width of the steel strip. This is particularly the case for the oxidising of steel strips having a width that is wider than the width of the central compartment.

In a further preferred embodiment the device further comprises third inlet means coupled to a third conduit, for providing the oxidising gas mixture to the second pair of outer compartments. As will be apparent from the elucidation above, this embodiment is particularly beneficial for steel strips that are wider than the combined width of the central compartment and the first pair of outer compartments.

Advantageously, the second conduit extends via a first additional conduit to the first pair of outer compartments for providing the oxidising gas mixture. This measure guarantees that the oxidising gas mixture is equally divided over the two compartments of the pair of outer compartments. When wider steel strips are to be processed a third conduit comes into operation according to the same principle. The third conduit extends via a second additional conduit to the second pair of outer compartments for providing the oxidising gas mixture. In a suitable arrangement the second and third conduits have an equal length, preferably extending half-way into the internal chamber. This will allow for an equal division of the oxidising gas mixture to the pair of outer compartments. Since they are always controllable together in pairs, the flow to a pair of outer compartments can be controlled in a reproducible manner. Naturally, other configurations, such as the use of narrower or wider parts in the design of the second and third conduits could lead to the same result.

More advantageously, a further conduit extends via a further additional conduit to an additional pair of outer compartments for providing the oxidising gas mixture. As described before, this measure guarantees that the oxidising gas mixture is equally divided over an additional pair of outer compartments.

In a preferred embodiment the device is rotatable along an axis parallel to a width direction of the steel strip, attuned to achieve a preferred angle between the axis of projection of the one or more openings and the steel strip during processing. This is very beneficial since it changes the travelling distance of the oxidising gas mixture from the openings to the surface of the steel strip. The preferred setting in some cases will be that the angle between the openings and the steel strip is a right angle (or a 90 degree angle). However, in some other cases it may be preferable and beneficial for the angle to be different, more than 90 degrees, or less than 90 degrees. Changing the angle will change the travelling distance from the oxidising gas mixture out of the one or more openings to the steel strip.

In a preferred embodiment the device is designed such that the one or more openings, preferably embodied as one or more nozzles or slits, are arranged in a sunk manner. This has the advantage that less dirt will accumulate, leading to a more reliable process. All openings, such as nozzles, could be designed having equal dimensions such that an equal flow of gas is guaranteed. Every opening can be controlled such that an even amount of gas reaches the steel strip. The nozzles could also be interchangeable. This allows the application of different nozzles having different designs, sizes, configuration, orifices and such to the device, to specifically control the flow of the gas to the steel strip.

The annealing line further comprises optionally a cooling section and/or a hot dip galvanising line. As this is well known to a person skilled in the art this will not require any further explanation.

The invention further relates to a device for use in an annealing line wherein the internal chamber is divided into three or more compartments. It also relates to a device according to the features explained earlier in relation to the annealing line.

The invention also relates to a method for annealing a steel strip using the annealing line of the invention, the steel strip having a variable width during the annealing of the steel strip. As elaborated earlier, the width of the steel strip in the annealing line varies. Because the steel strip has a variable width during the annealing process, each compartment is provided with the oxidising gas mixture depending on a width of the steel strip. Therefore, the annealing line of the invention will give a greater flexibility in the provision of oxidising gas mixture to the surface of the steel strip. The wider the steel strip, the more compartments will be used to provide the oxidising gas mixture to the surface of the steel strip. In general the central compartment will always be in use, and one or more pairs of outer compartments will be used depending on the width of the steel strip. Therefore, each compartment is provided with the oxidising gas mixture depending on the width of the steel strip.

BRIEF DESCRIPTION OF THE DRAWINGS

The invention will hereinafter be further elucidated with reference to the drawing of an exemplary embodiment according to the invention that is not limited as to the appended claims.

In the drawing.

DETAILED DESCRIPTION OF THE INVENTION

Figure 1:
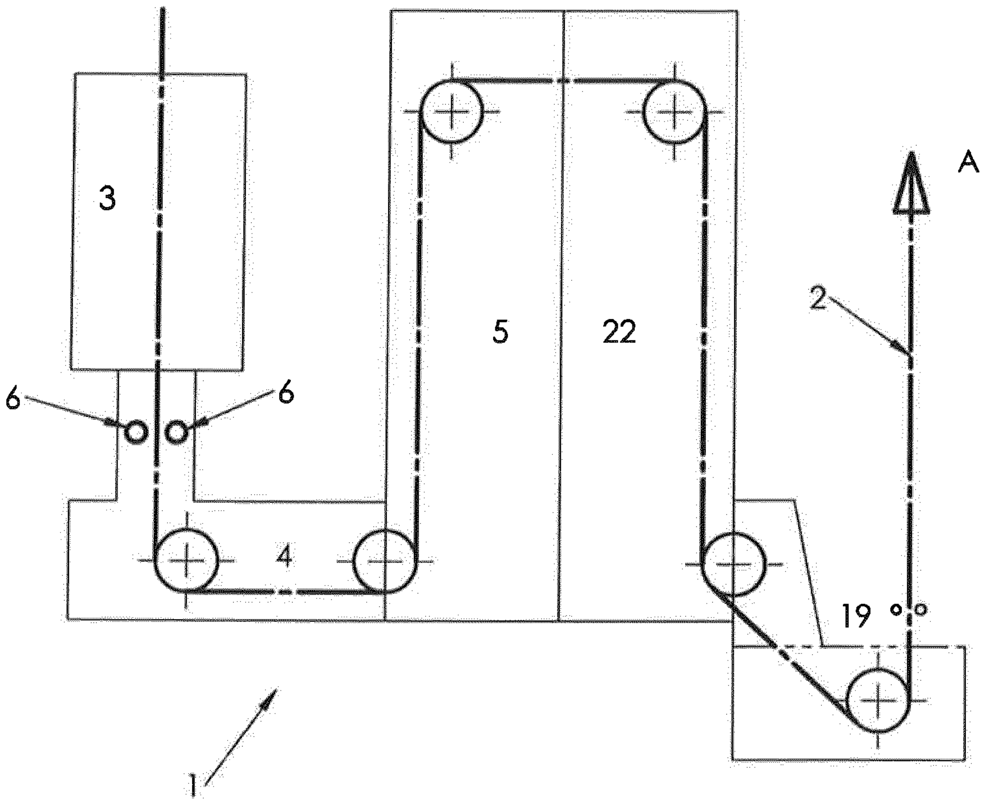
FIG. 1 shows an annealing line in schematic form.

Whenever in the figures the same reference numerals are applied, these numerals refer to the same parts.

FIG. 1 relates to an annealing line (1) for a steel strip (2) which, as such, is well known to a person skilled in the art. The annealing line comprises a first heating section (3), for example a direct flame furnace section (DFF) or a non-oxidising furnace (NOF), a connecting chamber (4) connecting the first heating section (3) and a second heating section (5), for example a radiant tube furnace section (RTF). A steel strip (2) is processed, or annealed, in the direction of (A) and optionally comprises a cooling section (22) and/or a hot dip galvanising line (19). In the connecting chamber (4) one or more devices (6) are located, arranged on one or both sides of the steel strip (2) for oxidising the steel strip (2) using an oxidising gas mixture.

Figure 2:
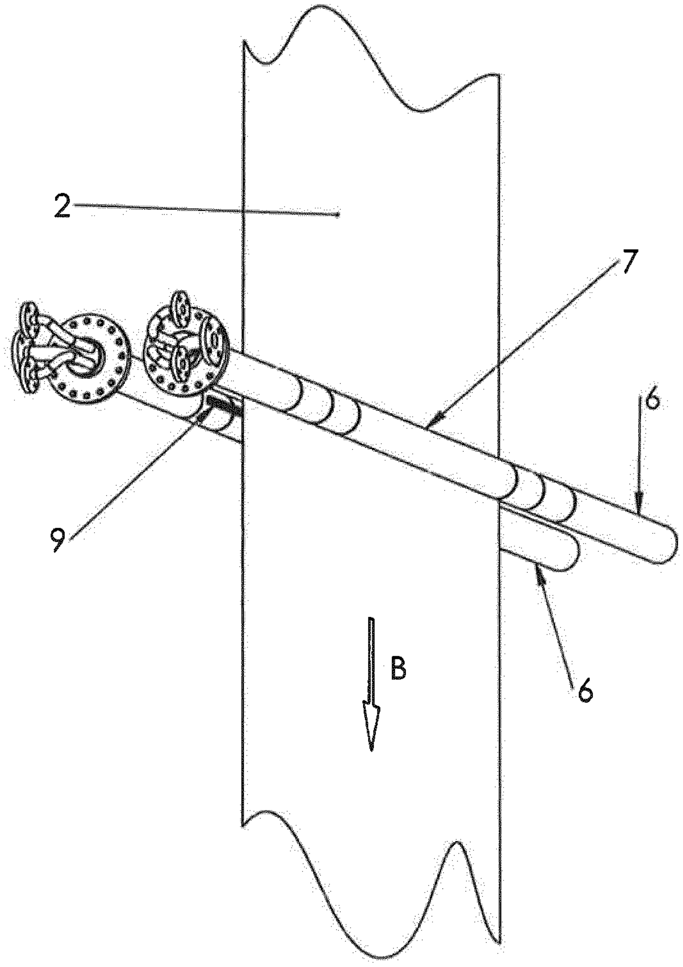
FIG. 2 shows the steel strip and a device for oxidising the steel strip in the connecting chamber.

FIG. 2 shows the steel strip (2) travelling in the direction of (B) in the connecting chamber (4) (the connecting chamber itself is not shown as the location is clearly shown in FIG. 1). The one or more devices (6), having a body (7) are, in use, arranged on one or both sides of the steel strip (2). In this embodiment one device (6) on both sides of the steel strip is shown, but other configurations are also possible. When the steel strip travels in the direction of (B), an oxidising gas mixture will flow out of the one or more openings (9) (more clearly shown in FIGS. 3, 4 and 5) to the surface of the steel strip (2) and will oxidise the alloying elements present.

Figure 3:
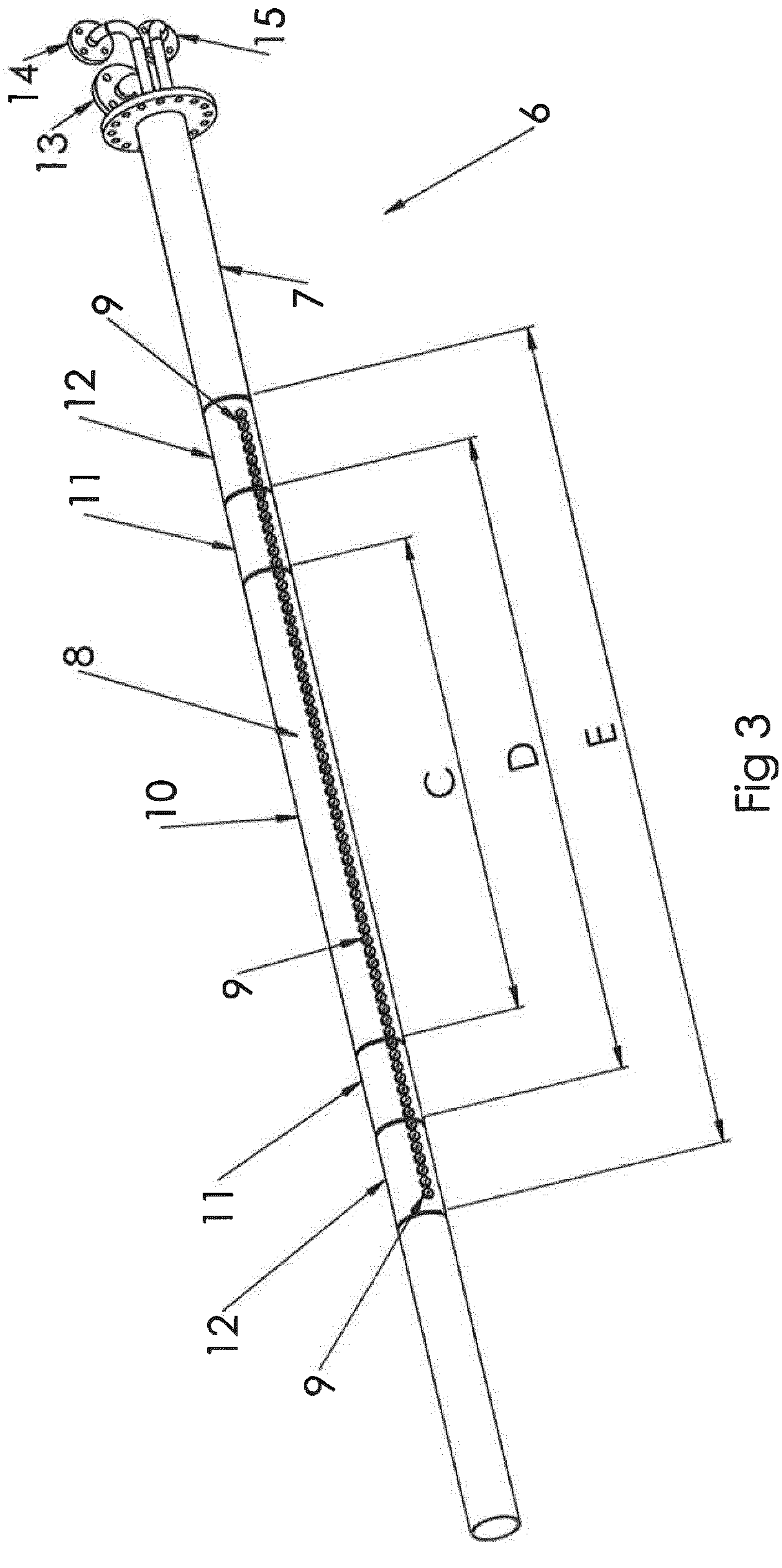
FIG. 3 shows the device in more detailed view.

FIG. 3 shows the device (6) in more detail. The device (6) has a body (7) comprising an internal chamber (8) and one or more openings (9) to project the oxidising gas mixture onto the surface of the steel strip (2) (not shown here, but clearly shown in FIG. 2). The internal chamber (8) is divided into three or more compartments (10, 11, 12). In this particular figure, 5 compartments are shown. More particularly, the internal chamber (8) comprises a central compartment (10) and a first pair of outer compartments (11). Each outer compartment (11) is positioned adjacent to the central compartment (10) and the pair of outer compartments (11) is controllable together. The width of the central compartment (10) is indicated by (C). For the narrowest width of steel strips (2) it is sufficient that only oxidising gas mixture will flow through the central compartment (10) via the one or more openings (9) to the steel strip (2). The width (C) thus corresponds to the narrowest width of steel strips (2) to be oxidised. Therefore the central compartment (10) is always provided with the oxidising gas mixture when the one or more devices (6) are in use.

The first pair of outer compartments (11) is controllable together, meaning the oxidising gas mixture is always evenly distributed over the two compartments with oxidising gas mixture, which will be explained later.

The first pair of outer compartments (11) consists of two outer compartments (11), each outer compartment (11) is positioned adjacent to the central compartment (10). In the embodiment shown, the two outer compartments (11) are positioned adjacent to the central compartment (10) in a symmetrical way, but naturally, other configurations may be possible that are attuned to the specific needs of the steel strip (2) to be oxidised. The width of the central compartment (10) together with the first pair of outer compartments is indicated with (D). The outer compartments (11) adjacent to the central compartment (10) are used when the width of the steel strip is wider than the width of the central compartment (C). In that case the central compartment (10), together with the first pair of outer components will project the oxidising gas onto the steel strip. The first pair of outer compartments (11) is controllable together, meaning that the pair is always controlled as one unit, split into two parts. This will guarantee a more even flow of oxidising gas medium to the steel strip (2). The same principle applies to the second and further pairs of outer compartments (11, 12).

The internal chamber (8) is configured as further having a second pair of outer compartments (12), each outer compartment (12) is positioned adjacent to the first pair of outer compartments (11) and the second pair of outer compartments (12) is controllable together. When the width of the steel strip to be oxidised is wider than the width of the central compartment and the first pair of outer compartments, indicated with (D), two more outer compartments will be used, leading to the oxidising of an even wider steel strip (2), with a total of five compartments, indicated with (E).

The maximal width of the steel strip (2) to be oxidised in this embodiment is indicated with (E). This means that in this embodiment the central compartment (10) as well as the first pair of outer compartments (11) and the second pair of outer compartments (12) are used. However, depending on the specifications of the steel strip (2) to be oxidised, one or more additional pairs of outer compartments could be added. Each outer compartment of each additional pair of outer compartments is positioned adjacent to an outer compartment of another pair of outer compartments and the outer compartments in each additional pair is controllable together.

As is shown in this figure, but also in FIGS. 2 and 4 to 6, the device (6) has an elongated shape. This is particularly beneficial because of the different widths of steel strips (2) to be oxidised. In this way a one-on-one relation between the total width (C, D, E) of the active part of the device (6) and the steel strip (2) to be oxidised could be achieved.

Figure 4A:
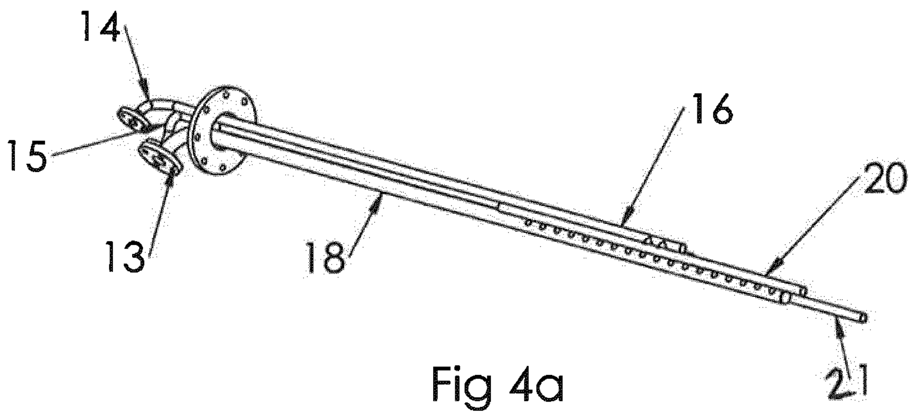
FIG. 4 shows the device in an open view without the surrounding body in different angles.
Figure 4B:
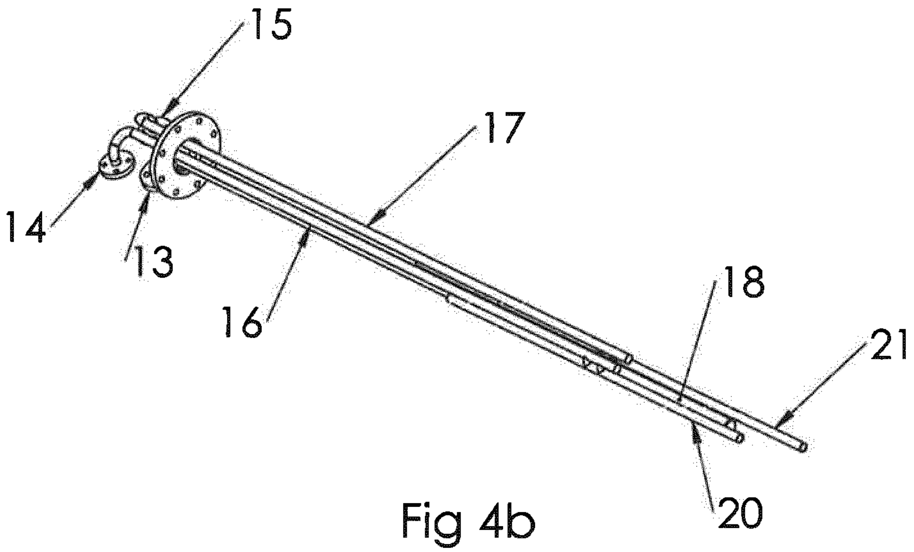
Figure 4C:
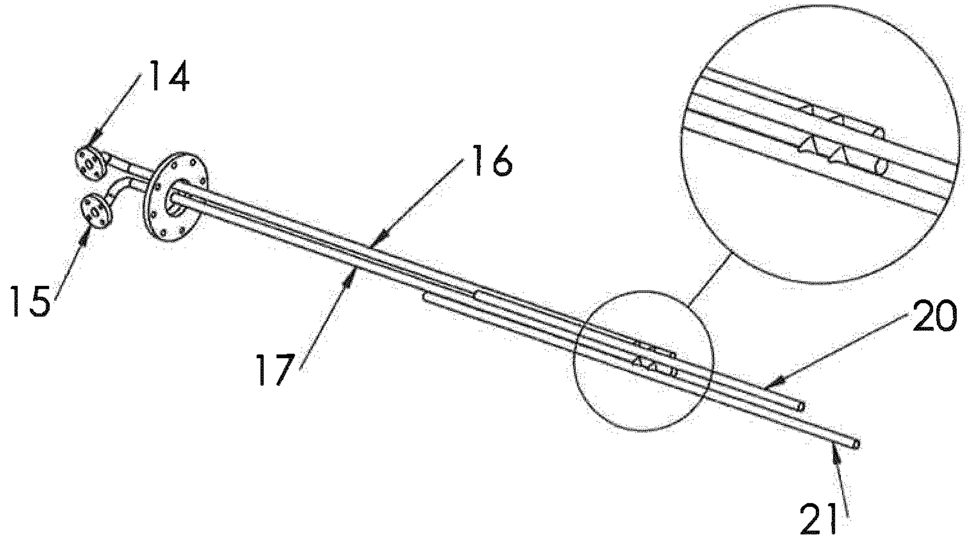

FIG. 4 is, for clarity purposes, split into FIGS. 4*a*, 4*b* and 4*c*. FIG. 4*a* shows a configuration of the device (6) comprising inlet means (13, 14, 15) for providing the oxidising gas mixture, a first inlet means (13) coupled to a first conduit (18) for providing the oxidising gas mixture to the central compartment (10) and the device further comprises a second inlet means (14) coupled to a second conduit (16) for providing the oxidising gas mixture to the first pair of outer compartments (11). As explained earlier, the central compartment (10) will provide the oxidising gas mixture via the one or more openings (9) to the steel strip (2) having a maximal width equal to the width (C) of the central compartment (10). Further, the second conduit (16) extending via a first additional conduit (20) to the first pair of outer compartments (11) for providing the oxidising gas mixture is shown.

FIG. 4*b* shows the same configuration, but from a different angle. In this figure is shown, more clearly than in FIG. 4*a*, that the device (6) further comprises third inlet means (15) coupled to a third conduit (17) extending via a second additional conduit (21) for providing the oxidising gas mixture to the second pair of outer compartments (12).

FIG. 4*c* does not show, for clarity purposes, the first inlet means (13) and the first conduit (18). This allows a more detailed view of the configuration of the second inlet means (14) coupled to a second conduit (16) and a first additional conduit (20) for providing the oxidising gas mixture to the first pair of outer compartments (11). It also shows in more detail than FIGS. 4*a* and 4*b* the configuration of the third inlet means (15) coupled to a third conduit (17) extending via a second additional conduit (21) to the second pair of outer compartments (12) for providing the oxidising gas medium.

To sum up the preferred combinations a Table 1 is shown underneath to provide an easy overview:

| Width | Compartments | Conducts | Additional conducts |
|---|---|---|---|
| ≤C | 10 | 13 + 18 | — |
| >C, ≤D | 10 + 11 | 13 + 18 + 14 + 16 | 20 |
| >D, ≤E | 10 + 11 + 12 | 13 + 18 + 14 + 16 + 15 + 17 | 21 |

Figure 5:
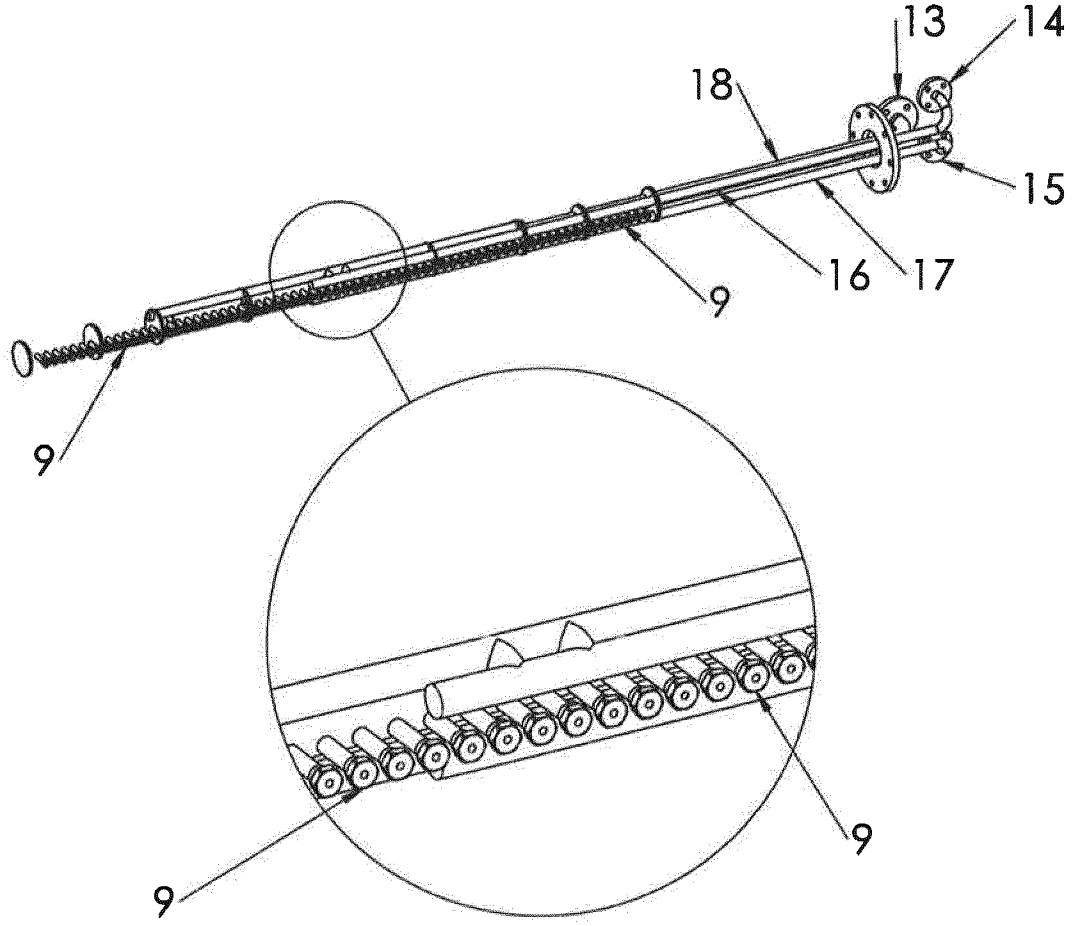
FIG. 5 shows the internal configuration of the device and particularly the openings in more detail.

FIG. 5 shows the device in an open view without the surrounding body. The openings (9) are clearly shown and in this embodiment are shown as a plurality of nozzles, but other openings, like slits, and other configurations, are also possible. Preferably, the one or more openings are embodied as nozzles or slits. In a part of FIG. 5 nozzles are shown in open view to provide a more detailed view. Also the configuration of the inlet means (13, 14, 15) and conduits (16, 17, 18) of the device are shown, where more details can be found of in FIG. 4. The one or more openings (9) are arranged in a sunk manner. Details of the positioning of the openings (9) can be found in FIG. 7.

Figure 6:
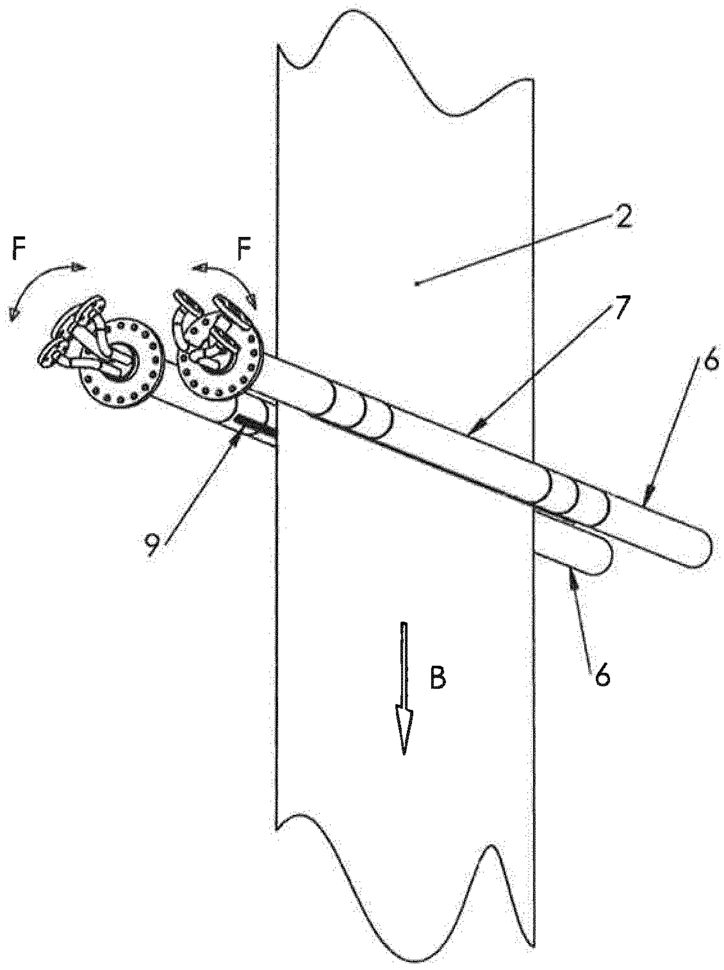
FIG. 6 shows a preferred embodiment of the device.

FIG. 6 shows that the device (6) is rotatable along an axis parallel to the width direction of the steel strip (2), attuned to achieve a preferred angle between the axis of projection of the one or more openings (9) and the steel strip (2) during processing. The rotation direction is indicated with (F) and can be adjusted according to the specifications of the steel strip (2) to be oxidised.

Figure 7:
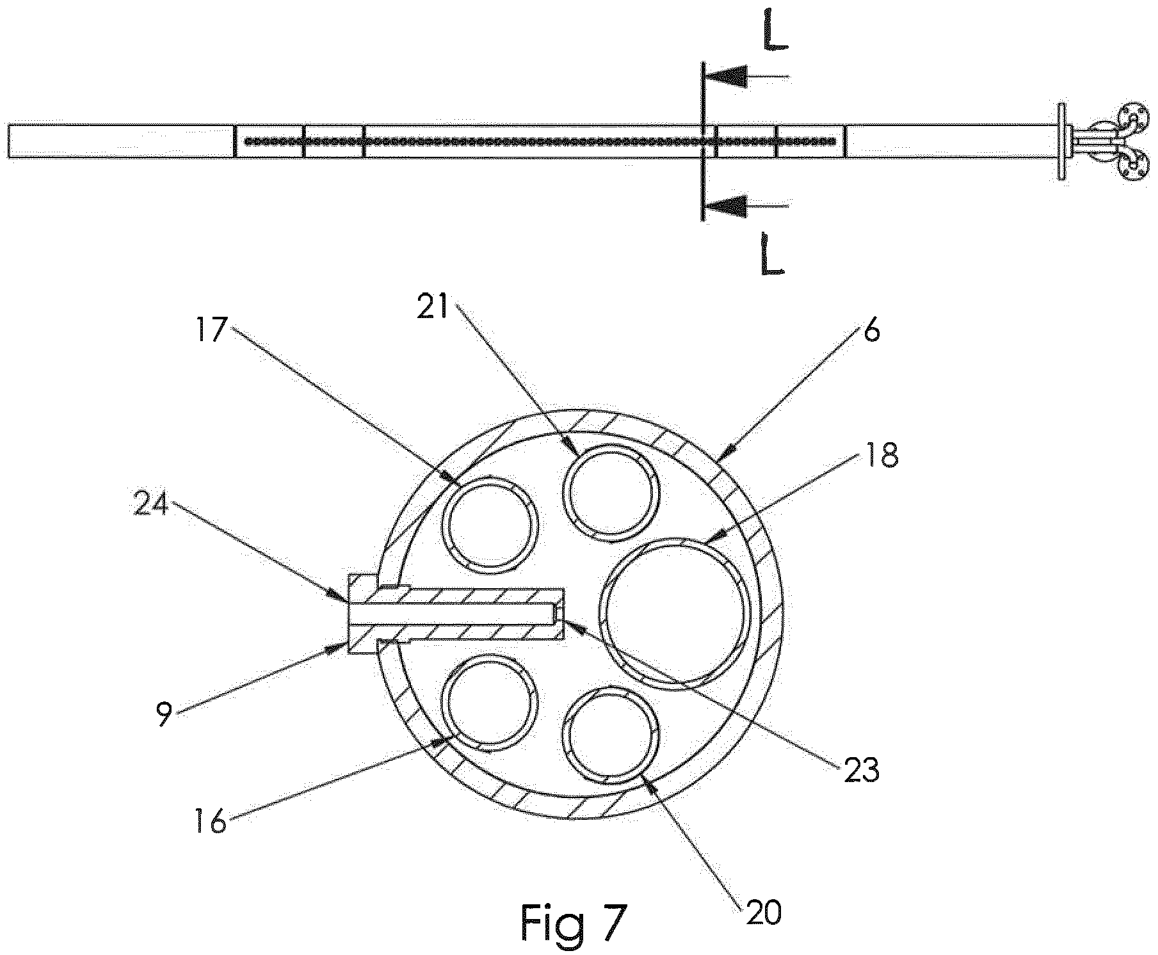
FIG. 7 shows the openings in more detail.

FIG. 7 shows the positioning of an opening (9) in the device (6) through section (L). The orifice (23) of the opening is clearly shown. The opening (9) protrudes into the interior of the device (6) where the oxidising gas mixture can flow through the orifice (23) and end (24) of the opening (9) to the steel strip (2). The openings (9) are replaceable and other designs and/or sizes than depicted here are imaginable with respect to the desired processing parameters.

Although the invention has been discussed in the foregoing with reference to exemplary embodiments of the invention, the invention is not restricted to these particular embodiments which can be varied in many ways without departing from the invention. The discussed exemplary embodiments shall therefore not be used to construe the appended claims strictly in accordance therewith. On the contrary, the embodiments are merely intended to explain the wording of the appended claims without intent to limit the claims to the embodiments. The scope of protection of the invention shall therefore be construed in accordance with the appended claims only, wherein a possible ambiguity in the wording of the claims shall be resolved using these exemplary embodiments.

The invention claimed is:

1. An annealing line for a steel strip comprising a connecting chamber connecting a first heating section and a second heating section, wherein one or more devices, located in the connecting chamber, are arranged on one or both sides of the steel strip for oxidising the steel strip using an oxidising gas mixture, each device having a body comprising an internal chamber and one or more openings to project the oxidising gas mixture onto the surface of the steel strip, wherein the internal chamber is divided into three or more compartments, wherein three said compartments of the internal chamber comprises respectively a central compartment and a first pair of outer compartments, each outer compartment is positioned adjacent to the central compartment, wherein the device comprises inlet means for providing the oxidising gas mixture, a first inlet means coupled to a first conduit for providing the oxidising gas mixture to the central compartment, the device further comprises a second inlet means coupled to a second conduit for providing the oxidising gas mixture to the first pair of outer compartments.

2. The annealing line according to claim 1, wherein the internal chamber further comprises a second pair of outer compartments, each outer compartment is positioned adjacent to the first pair of outer compartments.

3. The annealing line according to claim 2, wherein the internal chamber further comprises one or more additional pairs of outer compartments, each outer compartment of each additional pair of outer compartments is positioned adjacent to an outer compartment of another pair of outer compartments.

4. The annealing line according to claim 1, wherein the device has an elongated shape.

5. The annealing line according to claim 1, wherein the device further comprises third inlet means coupled to a third conduit, for providing the oxidising gas mixture to the second pair of outer compartments.

6. The annealing line according to claim 1, wherein the second conduit extends via a first additional conduit to the first pair of outer compartments for providing the oxidising gas mixture.

7. The annealing line according to claim 1, wherein the third conduit extends via a second additional conduit to the second pair of outer compartments for providing the oxidising gas mixture.

8. The annealing line according to claim 1, wherein a further conduit extends via a further additional conduit to an additional pair of outer compartments for providing the oxidising gas mixture.

9. The annealing line according to claim 1, wherein the device for projecting the oxidizing gas onto the surface of the steel strip is rotatable along an axis parallel to a width direction of the steel strip, attuned to achieve a 90 degree angle, an angle more than 90 degrees, or an angle less than 90 degrees, between the axis of projection of the one or more openings and the steel strip during processing.

10. The annealing line according to claim 1, wherein the one or more openings are arranged in a sunk manner.

11. A method for annealing a steel strip using the annealing line according to claim 1, the steel strip having a variable width during the annealing of the steel strip wherein each compartment of the internal chamber is provided with the oxidising gas mixture depending on a width of the steel strip.

12. The annealing line according to claim 1, wherein three said compartments of the internal chamber comprises a central compartment and a first pair of outer compartments, the pair of outer compartments is controllable together.

13. The annealing line according to claim 1, wherein the internal chamber further comprises a second pair of outer compartments, the second pair of outer compartments is controllable together.

14. The annealing line according to claim 2, wherein the internal chamber further comprises one or more additional pairs of outer compartments, the outer compartments in each additional pair is controllable together.

15. The annealing line according to claim 1, wherein the one or more openings, are embodied as one or more nozzles or slits, and are arranged in a sunk manner.

16. A device for use in an annealing line for a steel strip comprising a connecting chamber connecting a first heating section and a second heating section, said device having a body comprising an internal chamber and one or more openings to project the oxidising gas mixture onto the surface of the steel strip, wherein the internal chamber is divided into three or more compartments, wherein three said compartments of the internal chamber comprises respectively a central compartment and a first pair of outer compartments, each outer compartment is positioned adjacent to the central compartment, wherein the device comprises inlet means for providing the oxidising gas mixture, a first inlet means coupled to a first conduit for providing the oxidising gas mixture to the central compartment, the device further comprises a second inlet means coupled to a second conduit for providing the oxidising gas mixture to the first pair of outer compartments.

17. An annealing line for a steel strip comprising a connecting chamber connecting a first heating section and a second heating section, wherein one or more devices, located in the connecting chamber, are arranged on one or both sides of the steel strip for oxidising the steel strip using an oxidising gas mixture, each device having a body comprising an internal chamber and one or more openings to project the oxidising gas mixture onto the surface of the steel strip, wherein the internal chamber is divided into three or more compartments, wherein the device for projecting the oxidizing gas onto the surface of the steel strip is rotatable along an axis parallel to a width direction of the steel strip, attuned to achieve a 90 degree angle, an angle more than 90 degrees, or an angle less than 90 degrees between the axis of projection of the one or more openings and the steel strip during processing.

18. A method for annealing a steel strip using the annealing line according to claim 17, the steel strip having a variable width during the annealing of the steel strip wherein each compartment of the internal chamber is provided with the oxidising gas mixture depending on a width of the steel strip.

19. The annealing line according to claim 17, wherein three said compartments of the internal chamber comprises respectively a central compartment and a first pair of outer compartments, each outer compartment is positioned adjacent to the central compartment.

20. The annealing line according to claim 17, wherein the device has an elongated shape.

* * * * *